(12) United States Patent
Hirosawa (10) Patent No.: US 11,650,774 B2
(45) Date of Patent: May 16, 2023

(54) INFORMATION PROCESSING SYSTEM, INFORMATION PROCESSING APPARATUS, AND INFORMATION PROCESSING METHOD FOR AUTHENTICATION

(71) Applicant: FUJIFILM Business Innovation Corp., Tokyo (JP)

(72) Inventor: Tsutomu Hirosawa, Kanagawa (JP)

(73) Assignee: FUJIFILM Business Innovation Corp., Tokyo (JP)

(*) Notice: Subject to any disclaimer, the term of this patent is extended or adjusted under 35 U.S.C. 154(b) by 0 days.

(21) Appl. No.: 17/547,807

(22) Filed: Dec. 10, 2021

(65) Prior Publication Data

US 2023/0021914 A1  Jan. 26, 2023

(30) Foreign Application Priority Data

Jul. 21, 2021   (JP) .............................. JP2021-120980

(51) Int. Cl.
    *G06F 3/12*    (2006.01)
    *G06F 21/31*   (2013.01)
    *G06F 21/60*   (2013.01)

(52) U.S. Cl.
    CPC .......... *G06F 3/1238* (2013.01); *G06F 3/1222* (2013.01); *G06F 3/1273* (2013.01); *G06F 21/31* (2013.01); *G06F 21/608* (2013.01)

(58) Field of Classification Search
    None
    See application file for complete search history.

(56) References Cited

U.S. PATENT DOCUMENTS

| 10,965,452 | B2 | 3/2021 | Ota | |
|---|---|---|---|---|
| 2013/0107324 | A1* | 5/2013 | Kamath | ................ G06F 3/1288 358/1.15 |
| 2014/0055809 | A1* | 2/2014 | Nishida | ................ G06F 3/1238 358/1.14 |

FOREIGN PATENT DOCUMENTS

JP          2018-205906 A      12/2018

* cited by examiner

*Primary Examiner* — Thomas D Lee
(74) *Attorney, Agent, or Firm* — Sughrue Mion, PLLC (57) ABSTRACT

An information processing system includes: an authenticator that authenticates one or more image processing apparatuses using authentication information of a user in response to receipt of the authentication information; and a server including a processor configured to permit the user to use an image processing apparatus that has location information related to the authentication information of the user among the authenticated one or more image processing apparatuses.

6 Claims, 8 Drawing Sheets

INFORMATION PROCESSING SYSTEM, INFORMATION PROCESSING APPARATUS, AND INFORMATION PROCESSING METHOD FOR AUTHENTICATION

CROSS-REFERENCE TO RELATED APPLICATIONS

This application is based on and claims priority under 35 USC 119 from Japanese Patent Application No. 2021-120980 filed Jul. 21, 2021.

BACKGROUND

(i) Technical Field

The present disclosure relates to an information processing system, an information processing apparatus, and an information processing method.

(ii) Related Art

Japanese Unexamined Patent Application Publication No. 2018-205906 describes an image processing apparatus capable of communicating with a user's mobile terminal including an authentication module for biometric authentication. In response to receipt of verification data issued by a service providing system, the authentication module of the mobile terminal is used for biometric authentication, and the image processing apparatus requests a device authentication system cooperating with the service providing system to issue an authentication token.

SUMMARY

In some cases, a user who has been authenticated as a user registered in advance is authorized to use image processing apparatuses uniformly. The authenticated user is authorized to use all the image processing apparatuses or use all the functions of each image processing apparatus. However, it may be undesirable that a user who has been authenticated be authorized to uniformly use all image processing apparatuses and use all the functions of each image processing apparatus for security reasons, for example.

Aspects of non-limiting embodiments of the present disclosure relate to restriction of an authenticated user to use an image processing apparatus on a location-by-location basis, where each location is provided with an image forming apparatus.

Aspects of certain non-limiting embodiments of the present disclosure address the features discussed above and/or other features not described above. However, aspects of the non-limiting embodiments are not required to address the above features, and aspects of the non-limiting embodiments of the present disclosure may not address features described above.

According to an aspect of the present disclosure, there is provided an information processing system including: an authenticator that authenticates one or more image processing apparatuses using authentication information of a user in response to receipt of the authentication information; and a server including a processor configured to permit the user to use an image processing apparatus that has location information related to the authentication information of the user among the authenticated one or more image processing apparatuses.

BRIEF DESCRIPTION OF THE DRAWINGS

An exemplary embodiment of the present disclosure will be described in detail based on the following figures, wherein.

DETAILED DESCRIPTION

An exemplary embodiment of the present disclosure will be described in detail with reference to the accompanying drawings.

Overall Configuration of Information Processing System 1

Figure 1:
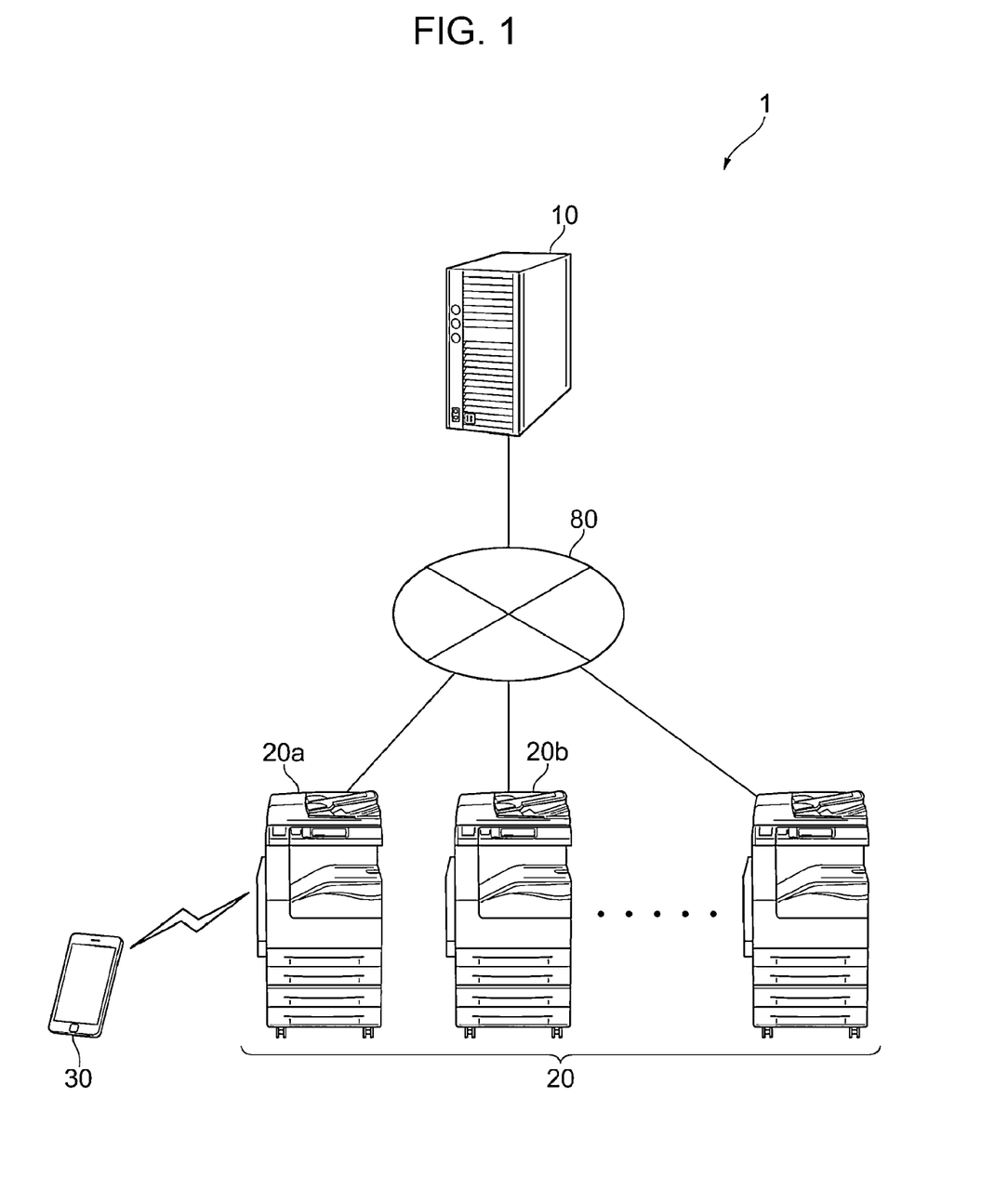
FIG. 1 illustrates an example overall configuration of an information processing system according to the exemplary embodiment.

FIG. 1 illustrates an example overall configuration of an information processing system 1 according to the exemplary embodiment.

As illustrated in FIG. 1, the information processing system 1 includes a server apparatus 10 and a plurality of image processing apparatuses 20 (such as image processing apparatuses 20a and 20b). The server apparatus 10 manages information for authorizing authenticated users to use the image processing apparatuses 20. Each of the image processing apparatuses 20 is an image processing apparatus that an authenticated user is restricted to use. The server apparatus 10 and the image processing apparatuses 20 are connected to each other via a communication line 80. The information processing system 1 may further include an authenticator 30 for authenticating a user who is to use the image processing apparatuses 20. The communication line 80 is, for example, a network such as the Internet and is used for information communication between the server apparatus 10 and the image processing apparatuses 20.

In this exemplary embodiment, the term "authorization" refers to the process of permitting a user to use a specific image processing apparatus 20. In this exemplary embodiment, the term "authentication" refers to the process of verifying the identity or authenticity of a person or an object by using any means. Authentication verifies the identity of a user who is to use an image processing apparatus 20, the authenticity of the image processing apparatus 20 that the user is authorized to use, and the like.

The server apparatus 10 is an information processing apparatus for providing, in response to a request sent from an image processing apparatus 20 through a user's operation, services to the user through the image processing apparatus 20. The services include management of document data, authorization information, authentication information, and the like by the server apparatus 10 according to this exemplary embodiment.

The document data is an uploaded electronic document. The document may include an image and text, or may include an image without text.

The authorization information is information registered in the server apparatus 10 in advance and is information indicating approval of the use of an image processing apparatus 20 and indicating a person who is permitted to use the image processing apparatus 20.

The authentication information is information identifying a user. The authentication information is used to authenticate one or more image processing apparatuses that the identified user is to use.

Each of the image processing apparatuses 20 is an apparatus for uploading or printing document data in response to an operation of a user who is to use the information processing system 1. In this exemplary embodiment, the image processing apparatuses 20 are each a multi-function peripheral for providing various image processing functions, such as an image reading function (scanning function), a printing function, a copying function, and a facsimile function, in response to an instruction given by an authenticated user. Authentication of a user is performed in response to an input of a user ID, a password, biometric information, or the like to the image processing apparatus 20 or the authenticator 30.

The authenticator 30 is an apparatus for receiving, when a user is to use an image processing apparatus 20, the user's authentication information requested by the image processing apparatus 20. More specifically, in response to a request from a user who is to use the information processing system 1 to log in to an image processing apparatus 20, the authenticator 30 authenticates the user based on the biometric information or the like and transmits obtained authentication information of the user to the image processing apparatus 20. Examples of the authenticator 30 include a tablet terminal, a smartphone, and a personal computer.

Hardware Configuration of Server Apparatus 10

Figure 2:
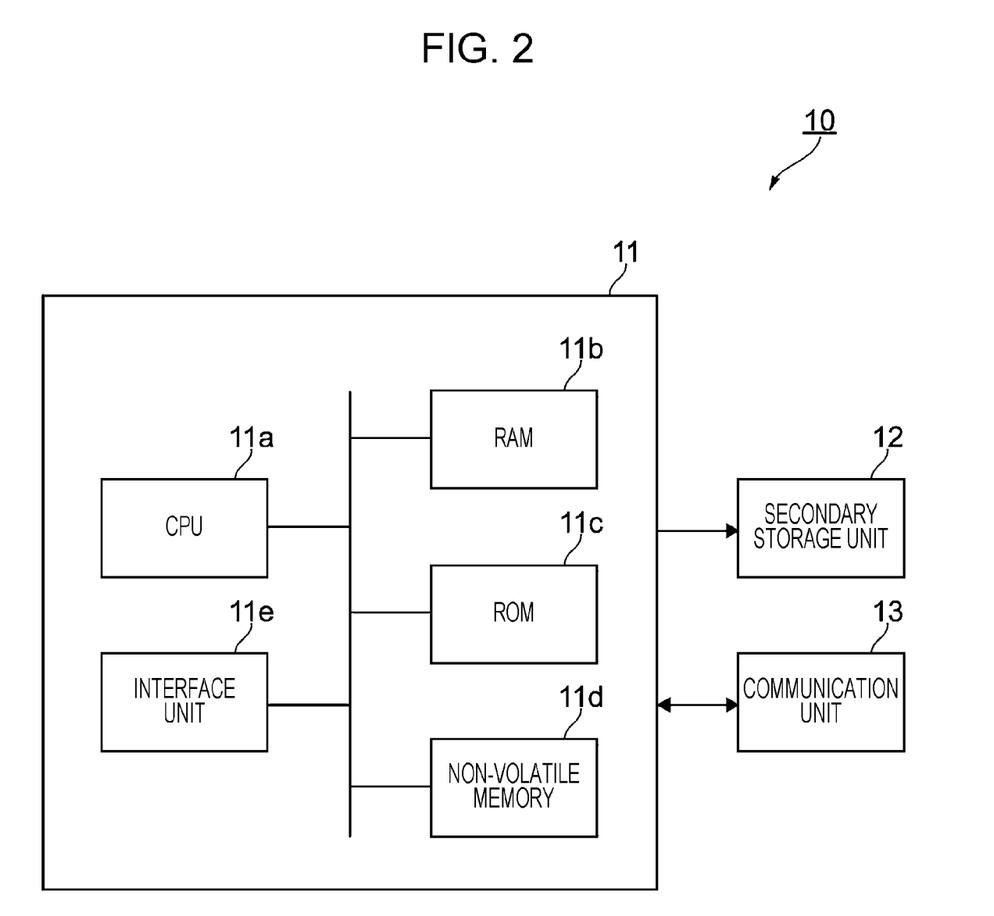
FIG. 2 is a block diagram illustrating an example hardware configuration of a server apparatus according to the exemplary embodiment.

FIG. 2 illustrates an example hardware configuration of the server apparatus 10 according to this exemplary embodiment.

The server apparatus 10 according to this exemplary embodiment includes an arithmetic processing unit 11 that executes digital arithmetic processing in accordance with a management program determined in advance for management of authorization information, a secondary storage unit 12, which is implemented by, for example, a hard disk drive (HDD) having recorded therein authorization information, authentication information, document data, and the like, and a communication unit 13 that transmits and receives information via the communication line 80 (see FIG. 1).

The arithmetic processing unit 11 includes a central processing unit (CPU) 11a serving as an example of a processor configured to control the overall operation of the server apparatus 10, a random access memory (RAM) 11b used as a work memory or the like for the CPU 11a, and a read-only memory (ROM) 11c storing a management program or the like to be executed by the CPU 11a. The arithmetic processing unit 11 further includes a non-volatile memory 11d that is rewritable and capable of holding data even when power is shut off, and an interface unit 11e that controls the communication unit 13 and other components connected to the arithmetic processing unit 11. The non-volatile memory 11d is constituted by, for example, a memory backed up by a battery, such as a static random access memory (SRAM) or a flash memory, and stores document data or the like to be printed by the image processing apparatuses 20. The secondary storage unit 12 also stores, as well as the document data and the like, a management program to be executed by the arithmetic processing unit 11. The arithmetic processing unit 11 reads the management program stored in the secondary storage unit 12 to execute various types of processes of the server apparatus 10 according to this exemplary embodiment.

Hardware Configuration of Image Processing Apparatus 20

Figure 3:
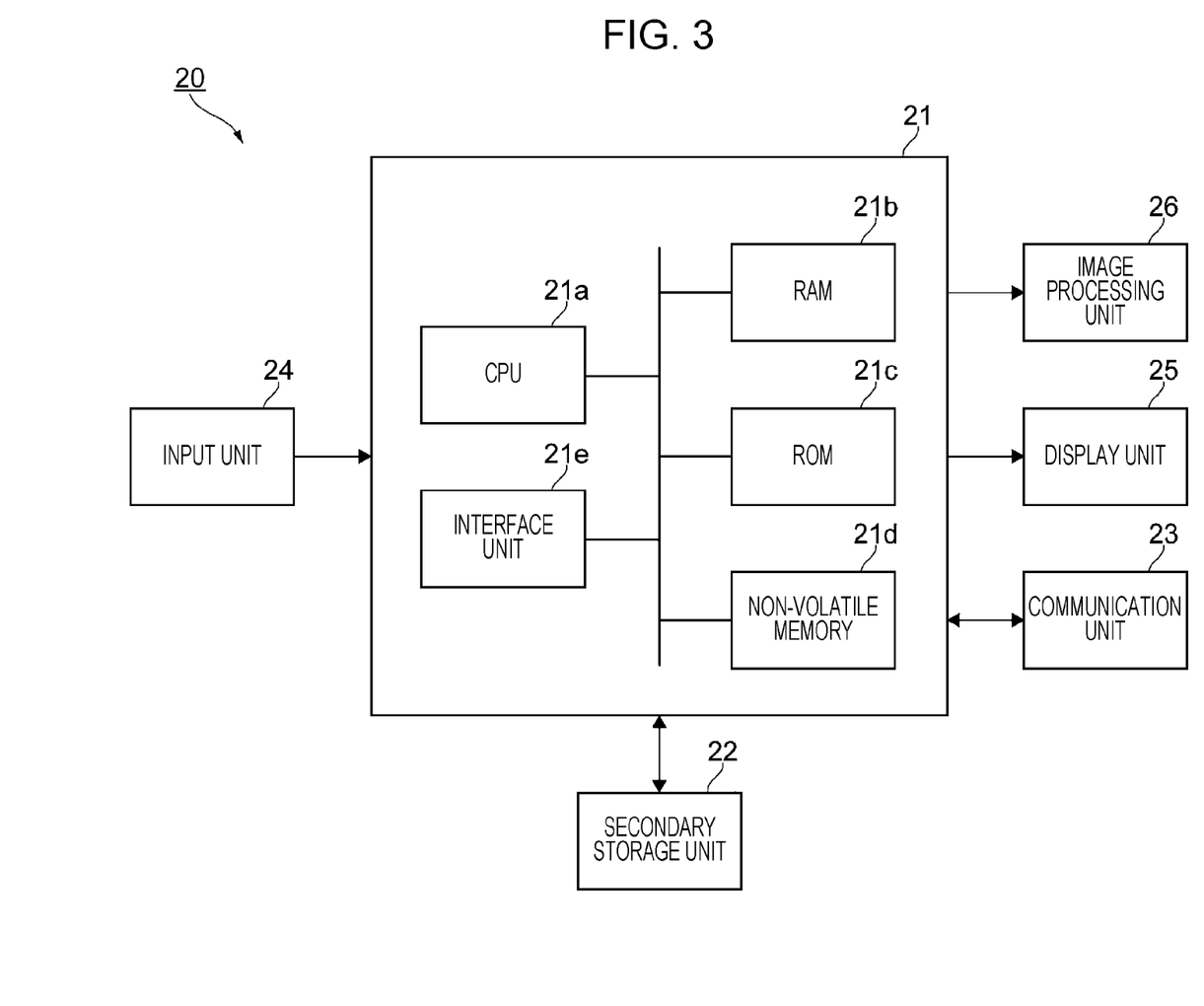
FIG. 3 is a block diagram illustrating an example hardware configuration of an image processing apparatus according to the exemplary embodiment.

FIG. 3 is a block diagram illustrating an example hardware configuration of each of the image processing apparatuses 20 according to this exemplary embodiment. Each of the image processing apparatuses 20 according to this exemplary embodiment includes an arithmetic processing unit 21 that executes digital arithmetic processing in accordance with a processing program determined in advance for restricting an authenticated user to use the image processing apparatus 20, a secondary storage unit 22, which is implemented by, for example, an HDD having recorded therein authorization information and the like, and a communication unit 23 that transmits and receives information via the communication line 80 (see FIG. 1). The image processing apparatus 20 further includes an input unit 24 that accepts an input operation from a user, such as keys or a touch panel, a display unit 25 that displays an image, text information, and the like to a user, such as a liquid crystal display panel or an organic electroluminescent (EL) display panel, and an image processing unit 26 that implements various image processing functions such as the scanning function, the printing function, the copying function, and the facsimile function.

The arithmetic processing unit 21 includes a CPU 21a serving as an example of a processor configured to control the overall operation of the image processing apparatus 20, a RAM 21b used as a work memory or the like for the CPU 21a, and a ROM 21c storing a processing program or the like to be executed by the CPU 21a. The arithmetic processing unit 21 further includes a non-volatile memory 21d that is rewritable and capable of holding data even when power is shut off, and an interface unit 21e that controls the input unit 24 and other components connected to the arithmetic processing unit 21. The non-volatile memory 21d is constituted by, for example, a memory backed up by a battery, such as an SRAM or a flash memory, and stores document data to be processed by the image processing unit 26. The secondary storage unit 22 also stores, as well as the authorization information and the like, an image processing program to be executed by the arithmetic processing unit 21. The arithmetic processing unit 21 reads the processing program stored in the secondary storage unit 22 to execute various types of processes of the image processing apparatus 20 according to this exemplary embodiment.

The programs to be executed by the CPUs 11a and 21a serving as an example of a processor are provided to the arithmetic processing units 11 and 21, respectively, such that the programs are stored in computer-readable recording media such as magnetic recording media (magnetic tapes, magnetic disks, etc.), optical recording media (optical disks, etc.), magneto-optical recording media, or semiconductor memories. The programs to be executed by the CPUs 11a and 21a may be downloaded to the server apparatus 10 and the image processing apparatus 20 via a communication means such as the Internet.

In this exemplary embodiment, the term "processor" refers to hardware in a broad sense. Examples of the processor include general processors (e.g., CPU: Central Processing Unit) and dedicated processors (e.g., GPU: Graphics Processing Unit, ASIC: Application Specific Integrated Circuit, FPGA: Field Programmable Gate Array, and programmable logic device).

In this exemplary embodiment, the term "processor" is broad enough to encompass one processor or plural processors in collaboration which are located physically apart from each other but may work cooperatively. The order of operations of the processor is not limited to one described in this exemplary embodiment, and may be changed.

Functional Configuration of Server Apparatus 10

Next, the functional configuration of the server apparatus 10 will be described.

Figure 4:
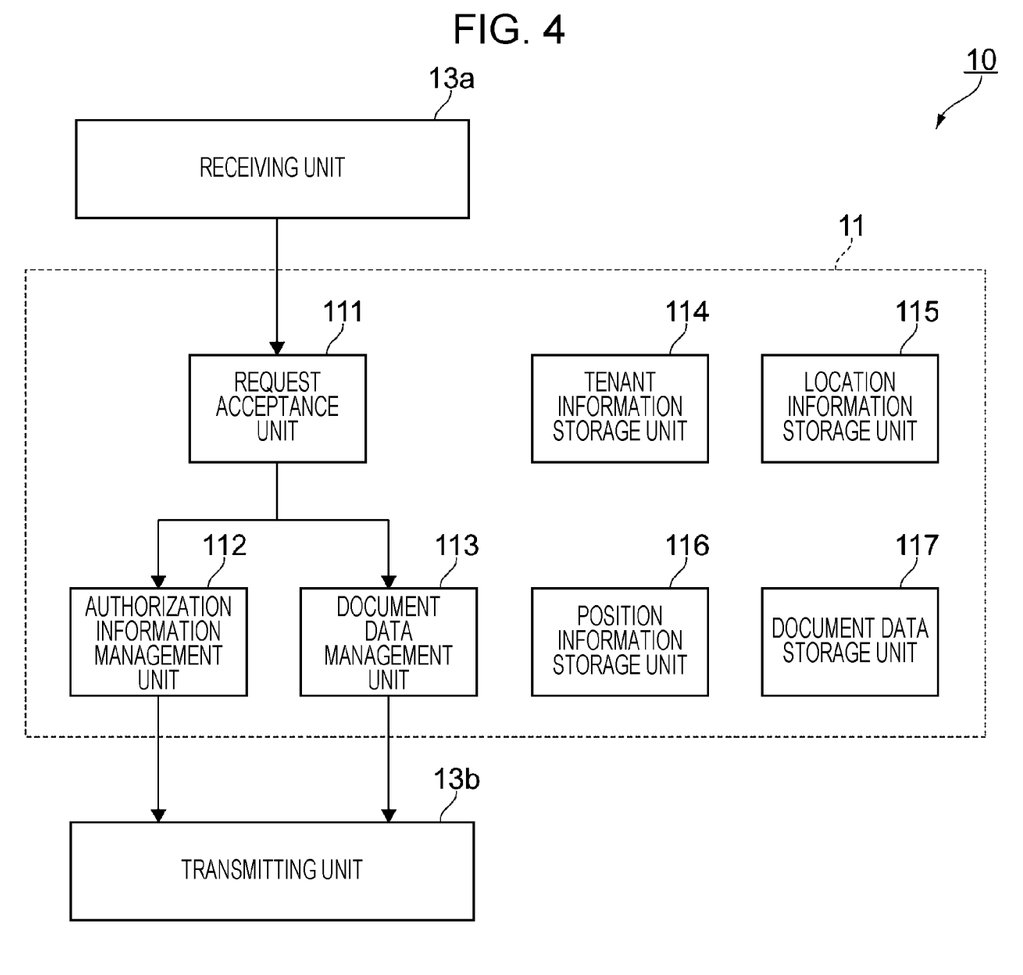
FIG. 4 is a block diagram illustrating an example functional configuration of the server apparatus according to the exemplary embodiment.

FIG. 4 is a block diagram illustrating an example functional configuration of the server apparatus 10 according to this exemplary embodiment. The server apparatus 10 includes a request acceptance unit 111, an authorization information management unit 112, a document data management unit 113, a tenant information storage unit 114, a location information storage unit 115, a position information storage unit 116, and a document data storage unit 117, and these components are implemented by the arithmetic processing unit 11 illustrated in FIG. 2. In FIG. 4, the communication unit 13 illustrated in FIG. 2 is divided into a receiving unit 13a and a transmitting unit 13b in accordance with the functions. The receiving unit 13a receives requests from the image processing apparatuses 20, authentication information, and the like. The transmitting unit 13b transmits authorization information and the like to the image processing apparatuses 20.

The request acceptance unit 111 acquires authentication information of an authenticated user and accepts a request from information transmitted from an image processing apparatus 20 or the like in response to an instruction from the user and received by the receiving unit 13a. More specifically, the request acceptance unit 111 accepts a request for, for example, providing or storing authorization information related to the image processing apparatus 20 and document data.

In accordance with the request accepted by the request acceptance unit 111, the authorization information management unit 112 searches the tenant information storage unit 114, the location information storage unit 115, and the position information storage unit 116 for the requested authorization information to determine whether the requested authorization information is stored in the tenant information storage unit 114, the location information storage unit 115, and the position information storage unit 116. If the requested authorization information is stored, the authorization information management unit 112 retrieves the requested authorization information and transmits the authorization information to the requesting image processing apparatus 20 through the transmitting unit 13b. The authorization information management unit 112 further acquires information related to the authenticator 30 or the image processing apparatus 20 that has requested the authorization information. Further, the authorization information management unit 112 updates the authorization information stored in the tenant information storage unit 114, the location information storage unit 115, and the position information storage unit 116 in accordance with the request accepted by the request acceptance unit 111.

In accordance with the request accepted by the request acceptance unit 111, the document data management unit 113 extracts the requested document data from the document data stored in the document data storage unit 117. More specifically, the document data management unit 113 retrieves the requested document data from the document data storage unit 117 and transmits the document data to the requesting image processing apparatus 20 through the transmitting unit 13b. In accordance with the request accepted by the request acceptance unit 111, further, the document data management unit 113 performs a process for storing document data acquired from the image processing apparatus 20 or the like in the document data storage unit 117. More specifically, the document data management unit 113 performs a process for extracting document data in accordance with a request from a user or an image processing apparatus 20 different from the user or the image processing apparatus 20 that has provided the document data.

The tenant information storage unit 114 stores tenant information. The tenant information is authorization information indicating a group of users to which the same authentication result is to be provided. More specifically, the tenant information storage unit 114 stores tenant information indicating a company, a department, a job title, or the like to which the users belong. The tenant information storage unit 114 is implemented by the non-volatile memory 11d.

The location information storage unit 115 stores location information. The location information is authorization information classifying the image processing apparatuses 20. More specifically, the location information storage unit 115 stores a location in which the image processing apparatuses 20 are installed. The location is a region or address of a building in which the image processing apparatuses 20 are installed. The location may be at least one of a floor or a room where the image processing apparatuses 20 are installed in the building. The location information storage unit 115 is implemented by the non-volatile memory 11d.

The position information storage unit 116 stores position information. The position information is authorization information indicating an image processing apparatus 20 used by a user. The position information may be information indicating a position relationship between the image processing apparatus 20 and the authenticator 30. The position information storage unit 116 stores the position information, for example, a relationship between the location information of the image processing apparatus 20 and a measurement result indicating a position measured by radio waves received at the authenticator 30 from a Global Positioning System (GPS) satellite, and the state of connection between the image processing apparatus 20 and the authenticator 30 via Bluetooth (registered trademark). The position information storage unit 116 is implemented by the non-volatile memory 11d.

The document data storage unit 117 stores the document data acquired by the document data management unit 113. The document data storage unit 117 is implemented by the non-volatile memory 11d.

Functional Configuration of Image Processing Apparatus 20

Next, the functional configuration of each of the image processing apparatuses 20 will be described.

Figure 5:
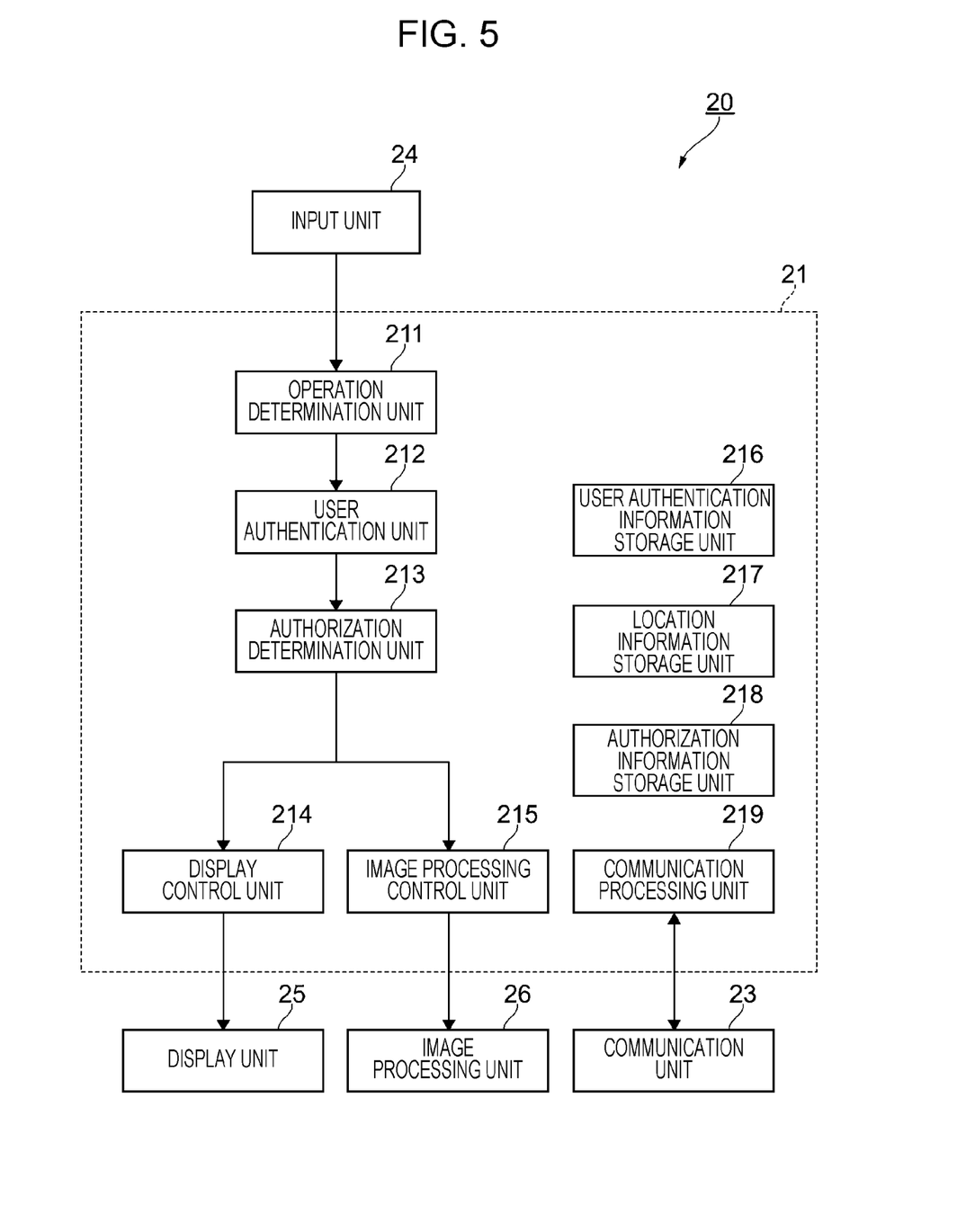
FIG. 5 is a block diagram illustrating an example functional configuration of the image processing apparatus according to the exemplary embodiment.

FIG. 5 is a block diagram illustrating an example functional configuration of each of the image processing apparatuses 20 according to this exemplary embodiment. As illustrated in FIG. 5, each of the image processing apparatuses 20 includes an operation determination unit 211, a user authentication unit 212, an authorization determination unit 213, a display control unit 214, an image processing control unit 215, a user authentication information storage unit 216, a location information storage unit 217, an authorization information storage unit 218, and a communication processing unit 219, and these components are implemented by the arithmetic processing unit 21 (see FIG. 3).

The operation determination unit 211 determines whether a user operation has been performed on the image processing apparatus 20 through the input unit 24 or the like. Examples of the user operation include an operation of logging in to the image processing apparatus 20, and an operation of instructing the image processing unit 26 to perform processing.

The user authentication unit 212 determines, based on the determination made by the operation determination unit 211, whether to authenticate the login of the user. More specifically, the user authentication unit 212 determines whether to authenticate the identity of the user who is to use the image processing apparatus 20. Examples of the condition for the authentication include matching the user ID, the password, the biometric information, or the like of the user with information registered in advance. In response to a request for a login from the user, the user authentication unit 212 may determine that the login of the user is authenticated when a request for Fast ID Online (FIDO) authentication of the user whose user ID, biometric information, or the like has been acquired is accepted from the authenticator 30.

The authorization determination unit 213 determines, based on registered authorization information indicating a person who is to be permitted to use the image processing apparatus 20 and authorization information for permitting a user authenticated by the user authentication unit 212 to use the image processing apparatus 20, whether to authorize the authenticated user to use the image processing apparatus 20. More specifically, the authorization determination unit 213 determines, based on the authorization information, an image processing function that the authenticated user is authorized to use.

The display control unit 214 controls, based on the content acquired from the operation determination unit 211, the user authentication unit 212, and the authorization determination unit 213, how an instruction image indicating an image processing function selected by the user is displayed, for example.

The image processing control unit 215 controls an image processing function to be used by the authenticated user, based on the content acquired from the operation determination unit 211, the user authentication unit 212, and the authorization determination unit 213. More specifically, the image processing control unit 215 stops all image processing functions, enables some of a plurality of image processing functions, or limits a change in the settings of various image processing functions or the like.

The user authentication information storage unit 216 acquires authentication information of the user from the user authentication unit 212 or the communication processing unit 219 and stores the authentication information.

The location information storage unit 217 acquires location information of the image processing apparatus 20 from the secondary storage unit 22 or the communication processing unit 219 and stores the location information.

The authorization information storage unit 218 acquires authorization information for permitting the use of the image processing apparatus 20 from the secondary storage unit 22 or the communication processing unit 219 and stores the authorization information.

The user authentication information storage unit 216, the location information storage unit 217, and the authorization information storage unit 218 are implemented by the non-volatile memory 21d.

The communication processing unit 219 processes information to be transmitted from the communication unit 23 or information received by the communication unit 23. The communication processing unit 219 acquires the content determined by the user authentication unit 212, extracts authentication information of a user who requests the use of the image processing apparatus 20, and sends a request for authorization information associated with the extracted authentication information to the server apparatus 10 via the communication unit 23. The communication processing unit 219 may acquire the content determined by the authorization determination unit 213 and, if the authenticated user is not authorized to use the image processing apparatus 20, provide a notification to an administrator who manages the information processing system 1 or the authenticated user via the communication unit 23 or make a request for authentication of another user. Further, the communication processing unit 219 acquires document data, authorization information, and the like from the server apparatus 10 or another image processing apparatus 20 via the communication unit 23, and provides information required for the user authentication unit 212, the authorization determination unit 213, the display control unit 214, the user authentication information storage unit 216, the location information storage unit 217, the authorization information storage unit 218, and the like. In other words, the communication processing unit 219 processes the acquired information and performs determination.

Process for Managing Authorization Information by Server Apparatus 10

Next, management of authorization information by the server apparatus 10 will be described with reference to FIGS. 4 and 6. In one example, the server apparatus 10 accepts a request for authorization information related to an authenticated user from an image processing apparatus 20.

Figure 6:
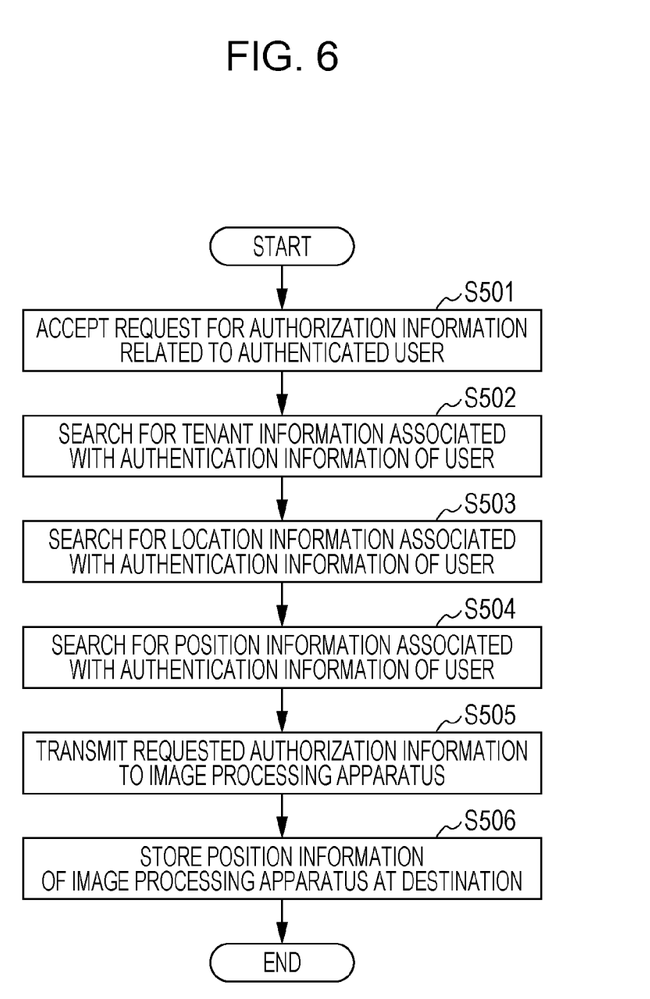
FIG. 6 is a flowchart illustrating a process for the server apparatus according to the exemplary embodiment to manage authorization information of a user.

FIG. 6 is a flowchart illustrating a process for the server apparatus 10 to manage authorization information.

In the flowchart illustrated in FIG. 6, the request acceptance unit 111 illustrated in FIG. 4 accepts a request for authorization information related to an authenticated user from information transmitted from an image processing apparatus 20 and received by the receiving unit 13a (step 501). The authorization information management unit 112 searches the tenant information storage unit 114 for tenant information associated with the authentication information of the user within the requested authorization information in accordance with the request accepted by the request acceptance unit 111 (step 502). The requested authorization information is, for example, tenant information for authenticating and restricting the use of an image processing apparatus 20 that a user whose identify has been authenticated is permitted to use, on a tenant-by-tenant basis, where each tenant is an entity to which the user belongs.

Then, the authorization information management unit 112 searches the location information storage unit 115 for location information associated with the authentication information of the user within the requested authorization information in accordance with the request accepted by the request acceptance unit 111 (step 503). The requested authorization information is, for example, location information for restricting the use of an image processing apparatus 20 that users having the same tenant information are permitted to use, in accordance with the location where the image processing apparatus 20 is installed.

Then, the authorization information management unit 112 searches the position information storage unit 116 for position information associated with the authentication information of the user within the requested authorization information in accordance with the request accepted by the request acceptance unit 111 (step 504). The requested authorization information is, for example, position information for restricting the use of an image processing apparatus 20 that users having the same location information are permitted to use, in accordance with the position of an image processing apparatus 20 that the users have previously used and the position relationship between the image processing apparatus 20 and the authenticator 30.

The authorization information management unit 112 retrieves the requested authorization information from the tenant information storage unit 114, the location information storage unit 115, and the position information storage unit 116 and transmits the authorization information to the requesting image processing apparatus 20 through the transmitting unit 13b (step 505). The position information storage unit 116 stores position information related to the image processing apparatus 20 to which the authorization information is to be transmitted (step 506). Then, the process ends.

Through the process described above, the server apparatus 10 provides information for restricting an authenticated user to operate the image processing apparatuses 20 on a location-by-location basis, where each location is associated with one or more image forming apparatuses. The server apparatus 10 manages the authorization information to save the time taken for the plurality of image processing apparatuses 20 to update the authorization information.

As described above, the server apparatus 10 is configured to provide authorization information to the image processing apparatuses 20, by way of example but not limitation. The server apparatus 10 receives location information or position information of an image processing apparatus 20 that has requested the authorization information together with authentication information of the user. The server apparatus 10 may determine, based on the received location information or position information of the image processing apparatus 20 and the search result of the authorization information management unit 112, whether to restrict an authenticated user to operate the image processing apparatus 20. This may reduce the amount of information to be transmitted to the image processing apparatus 20 and reduce the load on the image processing apparatus 20.

Process for Limiting Functions of Image Processing Apparatus 20

Next, a process for limiting functions of the image processing apparatus 20 will be described with reference to FIGS. 5, 7, and 8. In one example, authorization information related to an authenticated user is received in response to a request made to the server apparatus 10.

Figure 7:
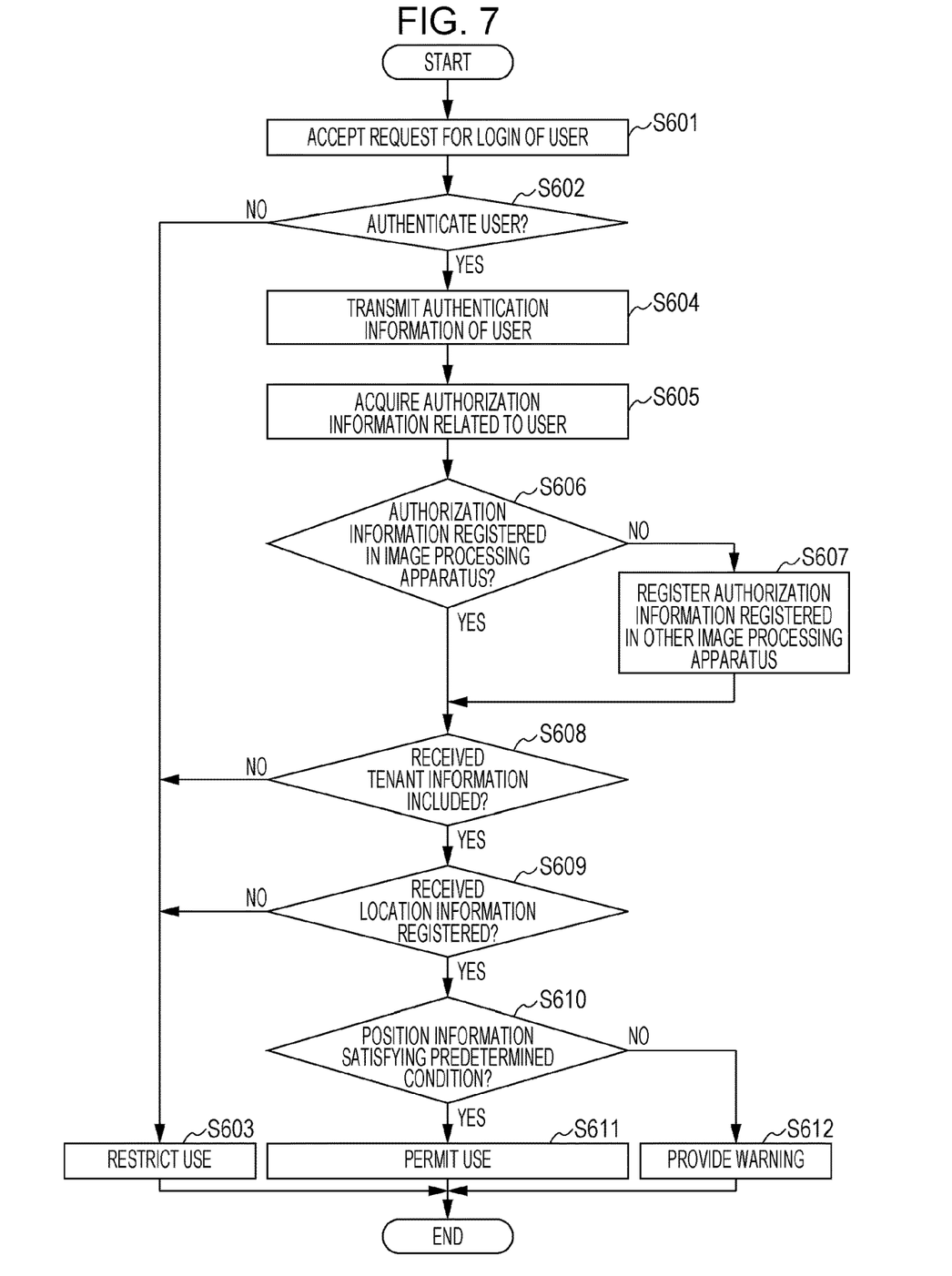
FIG. 7 is a flowchart illustrating a process for the image processing apparatus according to the exemplary embodiment to limit an image forming function.

FIG. 7 is a flowchart illustrating a process for the image processing apparatus 20 according to this exemplary embodiment to limit an image forming function.

Figure 8:
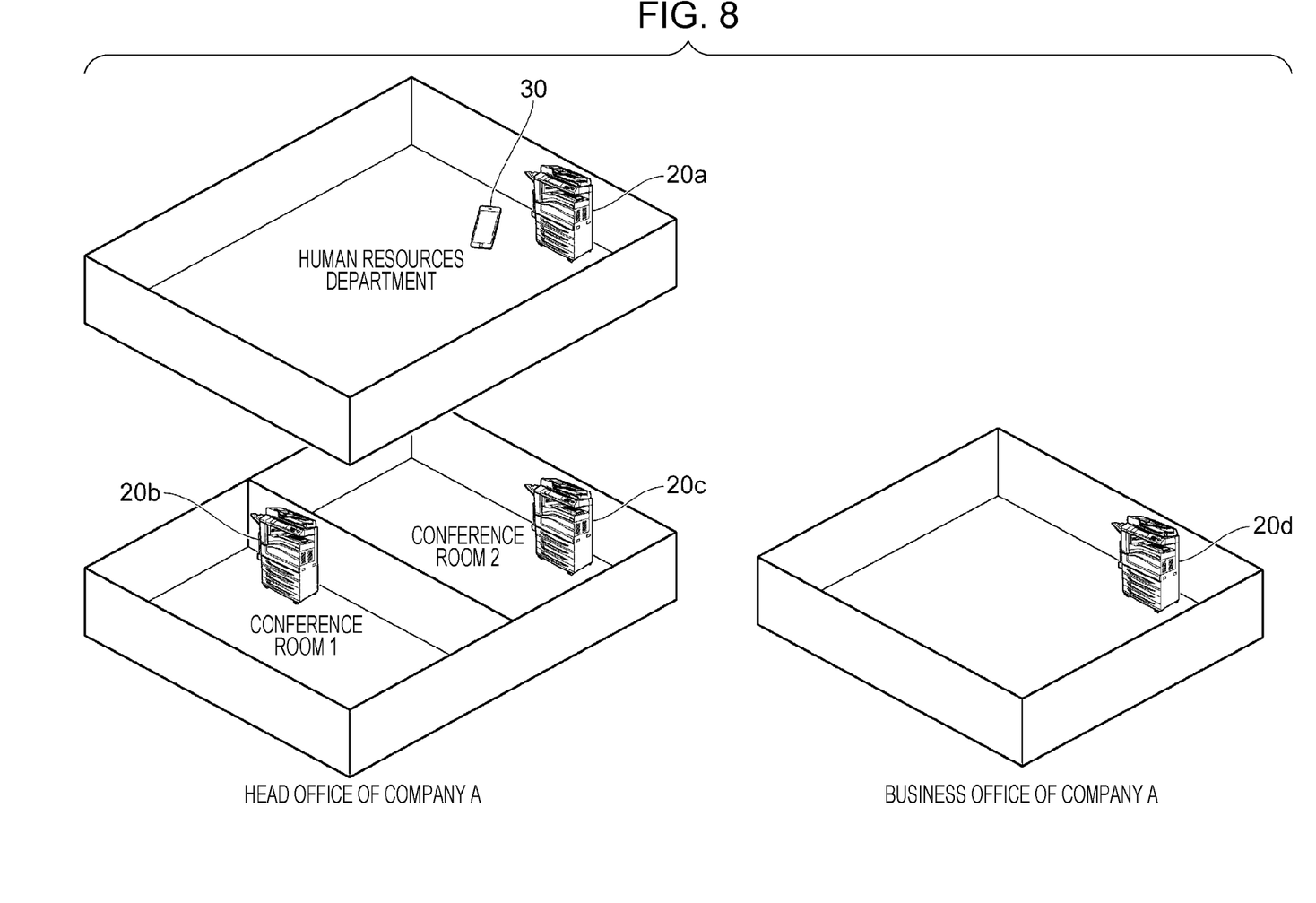
FIG. 8 is a diagram illustrating an example relationship among a plurality of image processing apparatuses according to this exemplary embodiment.

FIG. 8 is a diagram illustrating an example relationship among a plurality of image processing apparatuses according to this exemplary embodiment.

As illustrated in FIG. 8, Company A owns an image processing apparatus 20a installed in the room for the human resources department in the head office, an image processing apparatus 20b installed in conference room 1 in the head office, an image processing apparatus 20c installed in conference room 2 on the same floor as that of the conference room 1, and an image processing apparatus 20d installed in a business office at a different address from that of the head office. The authenticator 30 is used to authenticate a user. The image processing apparatuses 20a, 20b, and 20c installed in the head office are classified by location information different from that of the image processing apparatus 20d installed in the business office.

In the flowchart illustrated in FIG. 7, the operation determination unit 211 determines that a request for the login of a user has been accepted (step 601). The user authentication unit 212 determines, based on the content determined by the operation determination unit 211, whether to authenticate the user who requests the login (step 602). For example, if settings for authenticating a user who requests a login have not been set in the image processing apparatus 20b illustrated in FIG. 8, the user authentication unit 212 according to this exemplary embodiment acquires the settings of the image processing apparatus 20a or the image processing apparatus 20c having the same location information as that of the image processing apparatus 20b and to perform authentication in a shared manner.

If the user who requests the login is not authenticated in step 602 (NO in step 602), the image processing control unit 215 restricts the user to use the image processing apparatus 20 (step 603). Then, the process ends.

If the user who requests the login is authenticated in step 602 (YES in step 602), the communication processing unit 219 transmits authentication information of the user authenticated by the user authentication unit 212 to the server apparatus 10 via the communication unit 23 (step 604). The communication processing unit 219 acquires authorization information related to the user from the server apparatus 10 via the communication unit 23 (step 605).

Then, the authorization determination unit 213 determines whether the authorization information has been registered in the image processing apparatus 20 (step 606). If the authorization information has not been registered in the image processing apparatus 20 (NO in step 606), the communication processing unit 219 acquires the authorization information and the like from another image processing apparatus 20 via the communication unit 23 and registers the authorization information registered in the other image processing apparatus 20 (step 607). Then, the process proceeds to step 608. For example, the communication processing unit 219 according to this exemplary embodiment shares the tenant information registered in the image processing apparatus 20c having position information close to that of the image processing apparatus 20b illustrated in FIG. 8 based on the location information.

If it is determined in step 606 that the authorization information has been registered in the image processing apparatus 20 (YES in step 606), the authorization determination unit 213 determines whether the registered authorization information includes the tenant information received from the server apparatus 10 (step 608). If the tenant information received from the server apparatus 10 is not included (NO in step 608), the image processing control unit 215 restricts the user to use the image processing apparatus 20 (step 603). Then, the process ends. The restriction of the use of the image processing apparatus 20 is not limited to the prohibition of the use of all of the functions of the image processing unit 26. For example, the use of the copying function may be permitted.

If the tenant information received from the server apparatus 10 is included in step 608 (YES in step 608), the authorization determination unit 213 determines whether the location information received from the server apparatus 10 has been registered (step 609). For example, the authorization determination unit 213 according to this exemplary embodiment determines whether location information related to a user who operates the image processing apparatus 20a illustrated in FIG. 8 includes information indicating the head office of Company A. Alternatively, the authorization determination unit 213 may determine whether information indicating the second floor of the head office of Company A, the room for the human resources department, or the like is included as the location information.

If the location information received from the server apparatus 10 has not been registered in step 609 (NO in step 609), the image processing control unit 215 restricts the user to use the image processing apparatus 20 (step 603). Then, the process ends. The restriction of the use of the image processing apparatus 20 is not limited to whether the image processing unit 26 prohibits various image processing functions. For example, a detailed setting of "monochrome or color copying" may be restricted in the copying function. For example, the image processing control unit 215 according to this exemplary embodiment may perform control to set "monochrome copying" when location information related to a user who uses the copying function of the image processing apparatus 20b illustrated in FIG. 8 includes information indicating the head office of Company A, and to set "color copying" when the information indicating the head office of Company A is not included to address a request for color copying made by the user who may be a visitor.

If the location information received from the server apparatus 10 has been registered in step 609 (YES in step 609), the authorization determination unit 213 determines, based on the position information received from the server apparatus 10, whether position information related to the image processing apparatus 20 satisfies a predetermined condition (step 610). Examples of the predetermined condition include whether the image processing apparatus 20 is recorded in the history of one or more image processing apparatuses 20 that have previously been used by the authenticated user, and whether a position relationship between the authenticator 30 used for user authentication and the image processing apparatus 20b is the same as or similar to the previous position relationship of the authenticated user. For example, if a user who operates the image processing apparatus 20b illustrated in FIG. 8 has previously used the image processing apparatus 20b, the authorization determination unit 213 according to this exemplary embodiment determines that the position information related to the image processing apparatus 20 satisfies the predetermined condition.

If the position information related to the image processing apparatus 20 satisfies the predetermined condition in step 610 (YES in step 610), the image processing control unit 215 permits the user to use the image processing apparatus 20 (step 611). Then, the process ends.

If the position information related to the image processing apparatus 20 does not satisfy the predetermined condition in step 610 (NO in step 610), the communication processing unit 219 provides a warning via the communication unit 23 (step 612). Then, the process ends. For example, if the user who operates the image processing apparatus 20b illustrated in FIG. 8 has not previously used the image processing apparatus 20b, if the authenticator 30 used for user authentication is detected at a position different from that of the image processing apparatus 20b in terms of room or floor, or if the connection with the image processing apparatus 20b is disconnected, the communication processing unit 219 according to this exemplary embodiment provides a warning. The warning is a notification that the image processing apparatus 20 to be used by the user has not been previously used or is suspected to be used by an authenticated user, and is provided to the administrator who manages the information processing system 1 or the user.

Through the process described above, the image processing apparatus 20 restricts an authenticated user to use the image processing apparatus 20. Further, the image processing apparatus 20 does not uniformly authorize authenticated users to use the image processing apparatus 20.

As described above, each of the image processing apparatuses 20 is configured to receive authorization information from the server apparatus 10, by way of example but not limitation. Each of the image processing apparatuses 20 may receive from the server apparatus 10 information indicating the restriction of an authenticated user to use the image processing apparatus 20. This may save the operation of registering authorization information in the image processing apparatus 20.

As described above, furthermore, if position information related to the image processing apparatus 20 does not satisfy a predetermined condition, a warning is provided and then the process ends, by way of example but not limitation. If position information related to the image processing apparatus 20 does not satisfy the predetermined condition, the image processing apparatus 20 may further send an authenticated user a request for authentication information of the user. This does not prevent a user from using the image processing apparatus 20 if the use of the image processing apparatus 20 is not unauthorized, for example.

As described above, furthermore, a setting of an image processing function of the image processing apparatus 20 is restricted for each authenticated user, by way of example but not limitation. Authenticated users who are permitted to use the image processing apparatus 20 may be uniformly restricted to set an image processing function in accordance with location information of the image processing apparatus 20. For example, the copying function or the printing function may automatically be set to monochrome printing for an image processing apparatus 20 in a room for a department dedicated to creation of materials for internal employees, and may be permitted to be set to color printing for an image processing apparatus 20 in a room for a department dedicated to creation of materials for external use. This may save cost involved in using the image processing apparatuses 20.

Processes performed by the server apparatus 10 and the image processing apparatuses 20 in the information processing system 1 according to this exemplary embodiment are prepared as, for example, programs such as application software. The programs may be provided via a communication means or stored in recording media such as a compact disc read-only memory (CD-ROM).

The foregoing description of the exemplary embodiments of the present disclosure has been provided for the purposes of illustration and description. It is not intended to be exhaustive or to limit the disclosure to the precise forms disclosed. Obviously, many modifications and variations will be apparent to practitioners skilled in the art. The embodiments were chosen and described in order to best explain the principles of the disclosure and its practical applications, thereby enabling others skilled in the art to understand the disclosure for various embodiments and with the various modifications as are suited to the particular use contemplated. It is intended that the scope of the disclosure be defined by the following claims and their equivalents.

What is claimed is:

1. An information processing system comprising:
an authenticator configured to, in response to receiving authentication information of a user, authenticate one or more image processing apparatuses using the received authentication information; and a server including a processor configured to permit the user to use an image processing apparatus that has location information related to the received authentication information among the authenticated one or more image processing apparatuses, wherein the authenticator is configured to authenticate using the authentication information on a tenant-by-tenant basis, where each tenant is an entity, wherein an image forming function of an image processing apparatus among the one or more image processing apparatuses is restricted depending on a difference in the location information if the one or more image processing apparatuses are located in the same tenant, and wherein if the one or more image processing apparatuses authenticated using the authentication information and an unauthenticated image processing apparatus other than the one or more image processing apparatuses have a same location information, authentication is performed in a shared manner.

2. An information processing system comprising:

an authenticator configured to, in response to receiving authentication information of a user, authenticate one or more image processing apparatuses using the received authentication information; and a server including a processor configured to permit the user to use an image processing apparatus that has location information related to the received authentication information among the authenticated one or more image processing apparatuses, wherein the authenticator is configured to authenticate using the authentication information on a tenant-by-tenant basis, where each tenant is an entity, wherein an image forming function of an image processing apparatus among the one or more image processing apparatuses is restricted depending on a difference in the location information if the one or more image processing apparatuses are located in the same tenant, and wherein information about the tenant is shared across image processing apparatuses having similar position information using the location information among the one or more image processing apparatuses to allow one of the image processing apparatuses to use the information about the tenant in another one of the image processing apparatuses.

3. An information processing system comprising:

an authenticator configured to, in response to receiving authentication information of a user, authenticate one or more image processing apparatuses using the received authentication information; and a server including a processor configured to permit the user to use an image processing apparatus that has location information related to the received authentication information among the authenticated one or more image processing apparatuses, wherein the user is restricted to use the image processing apparatus classified by the location information, using position information indicating a position relationship between the image processing apparatus and the authenticator.

4. The information processing system according to claim 3, wherein the information processing system is configured to determine whether the position information satisfies a predetermined condition, using a history of use of the one or more image processing apparatuses by the user authenticated using the authentication information.

5. The information processing system according to claim 4, wherein the information processing system is configured to, in response to the position information not satisfying the predetermined condition, provide a notification that the image processing apparatus to be used by the user has not been previously used.

6. The information processing system according to claim 4, wherein the information processing system is configured to, in response to the position information not satisfying the predetermined condition, make a request for further authentication information to the user.

* * * * *